March 29, 1966 R. N. QUENNEVILLE ETAL 3,242,992
FEEDBACK SYSTEM
Filed Sept. 25, 1964
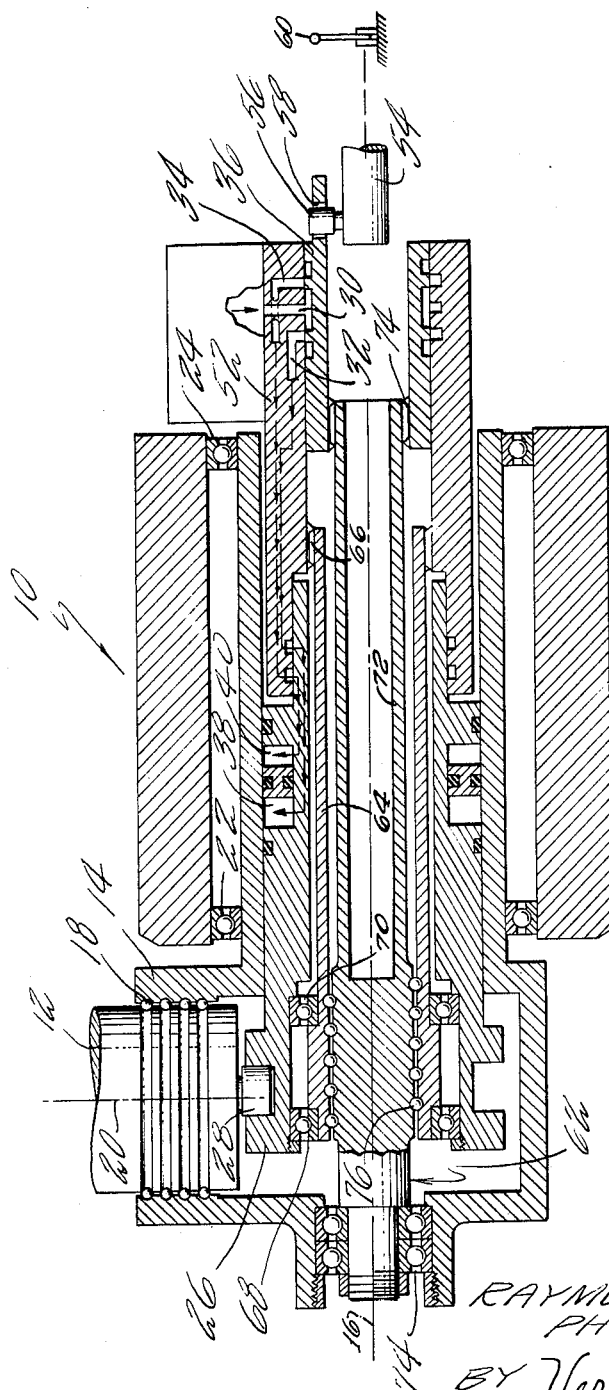
INVENTORS
RAYMOND N. QUENNEVILLE
PHILIP E. BARNES
BY Vernon F. Hauschild
ATTORNEY 3,242,992
FEEDBACK SYSTEM
Raymond N. Quenneville, Granby, and Philip E. Barnes, North Granby, Conn., assignors to United Aircraft Corporation, East Hartford, Conn., a corporation of Delaware
Filed Sept. 25, 1964, Ser. No. 399,286
5 Claims. (Cl. 170—160.32)

This invention relates to variable pitch propellers and more particularly to propeller blade pitch change feedback mechanisms for use therewith.

In the past, gear systems of the type shown in U.S. Patent Nos. 2,613,751, 2,849,072 and 2,850,103 have been used for pitch change feedback mechanisms for variable pitch propellers. Such gear systems are heavy, difficult to fabricate and inaccurate. These gear systems were necessary in aircraft propellers because the propeller has two modes of rotation, namely, rotation as driven by the engine to provide propulsion and also rotation to vary propeller blade pitch. Feedback is desired with respect to propeller blade pitch change only and hence propeller propulsive rotation must be eliminated from the total rotation signal to produce a propeller pitch change rotation signal for feedback. The elimination of the propeller propulsive rotation from the total propeller rotation is the purpose of the differential gear system.

It is an object of this invention to teach a pitch change feedback mechanism for use with a variable pitch propeller which eliminates propeller propulsive rotation signal and changes a translatory motion corresponding to propeller blade pitch change rotation into a rotary motion for pitch change feedback purposes and which is light in weight, simple in construction and efficient in operation.

It is a further object of this invention to teach a feedback mechanism for variable pitch propellers comprising concentric shafts joined by a pre-loaded ball screw.

It is still a further object of this invention to teach a feedback mechanism for a variable pitch propeller in which a rotary control signal is applied to the pitch change piston to cause translation thereof and wherein a first feedback shaft, which is restrained from rotation, translates with the pitch change piston and imparts a rotary motion to a second feedback shaft to which it is connected through a pre-loaded ball screw, and which second shaft is rotatably connected to the control input to provide a feedback motion thereto.

Other objects and advantages will be apparent from the specification and claims and from the accompanying drawing which illustrates an embodiment of the invention.

The single figure drawing in this application is a cross-sectional showing of a variable pitch propeller utilizing our feedback mechanism.

Referring to the drawing, we see variable pitch propeller 10, which includes a plurality of propeller blades 12, each contained within propeller barrel 14 and mounted thereby for thrust creating rotation about axis 16. Propeller blades 12 are also suppored by barrel 14, through bearings 18, for pitch change rotation about axis 20. Bearings 22 and 24 support propeller barrel 14 for rotation about axis 16.

Pitch change or power piston 26 is connected to blades 12 through yoke 28 so that as piston 26 rotates about axis 16 with blades 12, piston 26 is supported within propeller barrel and housing 14 so that it can translate along axis 16 to cause pitch change rotation of blade 12 through the action of yoke 28. Pitch change piston 26 is also caused to rotate as it translates due to the action of yoke 28 as it changes the pitch of blades 12.

Pitch change piston 26 is caused to translate by hydraulic power. High pressure fluid is provided to annulus 30 by conventional means and distributed therefrom to either annulus 32 or 34 depending upon the position of distributor valve sleeve 36. Annulus 32 is connected to pressure chamber 38 while annulus 34 is connected to pressure chamber 40 such that when annulus 30 is in communication with annulus 32, pressurized fluid is being provided to pressure chamber 38 while pressure chamber 40 and annulus 34 are connected to drain. The reverse condition exists when annulus 30 is in communication with annulus 34. In this fashion, power piston 26 can be caused to translate in opposite directions along axis 16.

Distributor valve sleeve 36 is mounted within housing 52 so that it may both translate and rotate. An input signal is fed to sleeve 36 through rotary input shaft 54 which carries roller 56 therewith. Roller 56 is received in arcuate or helical cam slot 58 of sleeve 36 so that rotation of roller 56 may cause translation or rotation of sleeve valve 36. Due to this connection between input shaft 54 and sleeve 36, through roller and cams 56 and 58, the rotary action of input shaft 54, which is actuated by pilot lever 60, causes a translatory action in sleeve valve 36 placing hydraulic annulus 30 into communication with either annulus 32 or 34, depending upon whether it is desired to increase or decrease blade pitch. The rotary motion of input shaft 54 imparts a translatory motion to valve 36 since shaft 72, to be described hereinafter, prevents rotation of sleeve 36.

Greater particulars with respect to the construction of propeller 10 may be had by reference to U.S. Patent No. 3,080,928, U.S. Patent No. 3,153,454 and U.S. Patent No. 3,163,231.

To provide a feedback signal or motion to distributor valve 36, feedback mechanism 62 is provided. Feedback mechanism includes outer feedback shaft 64, which is restrained in rotation by spline connection to housing 52 at splines or key 66 and which is supported and pre-loaded by bearings 68 and 70 so that shaft 64 translates with power piston 26. Feedback mechanism 62 also includes inner feedback shaft 72, which is mounted for rotation but restrained in translation by bearing unit 74. Shaft 72 is connected to distributor valve 36 through gears or splines 74. Preloaded ball or helical screw 76 connects shafts 64 and 72 such that the translatory action in shaft 64 caused by the translation of piston 26 transfers a very accurate rotary motion to shaft 72, which in turn transfers this rotary motion to distributor valve 36 to provide a rotary and translatory feedback motion and also to re-establish the original position of sleeve 36 due to the action of gears or spline 74 and cam and roller 56 and 58.

Ball screw 76 is pre-loaded by normal ball screw practice. Shaft 64 is necessary to feedback mechanism 62 since feedback mechanism 62 must register the pitch change motion only of power piston 26 and this is the translatory motion of piston 26. Since piston 26 also rotates with propeller 12 due to both propulsive drive and pitch change, shaft 72 could not be directly attached to piston 26 through ball screw 76.

In this fashion, when input shaft 54 alters the position of distributor valve 36 to translate piston 26 and feedback shaft 64, his translation of piston 26 and shaft 64 acts through ball screw 76 to establish a rotation in shaft 72, which rotation is imparted in feedback fashion to distributor valve 36 to re-establish its original position.

It is to be understood that the invention is not limited to the specific embodiment herein illustrated and described

We claim:

1. In a variable pitch propeller, means to vary the pitch of said propeller by a translatory motion, control means to govern said pitch varying means, and feedback means between said pitch varying means and said control means including a first shaft restrained from rotating and connected to translate with said pitch varying means, a second shaft restrained from translating and connected to said control means, and a helical screw connecting said shafts so that translation of said first shaft causes rotation of said second shaft to provide a feedback to said control means.

2. Apparatus according to claim 1 wherein said control means includes a valve sleeve positionable to control said pitch varying means and having a cam slot therein and to which said second shaft is connected for rotation, therewith and a rotary input shaft having a roller engaging said cam slot to cause said sleeve to translate in response to rotary motion of said input shaft.

3. Apparatus according to claim 2 wherein said second shaft is connected to said valve sleeve by teeth.

4. Apparatus according to claim 3 wherein said shafts are concentric.

5. In a variable pitch propeller having an axis, propeller blades mounted for rotation about said axis and for pitch change rotation, a power piston mounted to rotate with said propeller blades and to translate with respect thereto, means connecting said piston to said blades so that translation of said piston causes pitch change rotation of said blades, a hydraulic pressure system connected to cause said piston to translate, control means for said pressure system including a valve sleeve mounted for rotation and translation, input signal means including a cam and roller to translate said sleeve to control position, and feedback means between said piston and said sleeve including a first shaft restrained from rotation and connected to said piston to translate therewith, a second shaft concentric with said first shaft and restrained from translation and connected to rotate said valve sleeve, and a helical screw connecting said shafts so that blade pitch change translation of said piston and first shaft causes rotation of said second shaft to move said valve sleeve in feedback action.

References Cited by the Examiner

UNITED STATES PATENTS

| | | | |
|---|---|---|---|
| 1,942,189 | 1/1934 | Shepard | 91—380 |
| 2,849,072 | 8/1958 | Brahm | 170—160.2 |
| 2,850,103 | 9/1958 | Pearl | 170—160.2 X |

FOREIGN PATENTS

| | | |
|---|---|---|
| 1,260,746 | 4/1961 | France. |
| 629,540 | 9/1949 | Great Britain. |
| 904,744 | 8/1962 | Great Britain. |
| 966,431 | 8/1964 | Great Britain. |

SAMUEL LEVINE, *Primary Examiner.*

JULIUS E. WEST, *Examiner.*

E. A. POWELL, Jr., *Assistant Examiner.*